US008611911B2

(12) United States Patent
Lee et al.

(10) Patent No.: US 8,611,911 B2
(45) Date of Patent: Dec. 17, 2013

(54) METHOD AND APPARATUS OF CONTROLLING RESOURCE OF FEMTO BASE STATION FOR PROTECTING INTERFERENCE VICTIM TERMINAL AND CONTROLLING INTERFERENCE AMONG FEMTO BASE STATIONS

(75) Inventors: Nam Yoon Lee, Seoul (KR); Young Jun Hong, Seoul (KR); Kyung Hun Jang, Suwon-si (KR); Bruno Clerckx, Seoul (KR); Joon Young Cho, Suwon-si (KP)

(73) Assignee: Samsung Electronics Co., Ltd., Suwon-si (KR)

( * ) Notice: Subject to any disclaimer, the term of this patent is extended or adjusted under 35 U.S.C. 154(b) by 125 days.

(21) Appl. No.: 13/209,050

(22) Filed: Aug. 12, 2011

(65) Prior Publication Data
US 2012/0064904 A1    Mar. 15, 2012

(30) Foreign Application Priority Data
Aug. 13, 2010    (KR) .................. 10-2010-0078326

(51) Int. Cl.
*H04W 72/04*    (2009.01)
(52) U.S. Cl.
USPC ..................... 455/450; 455/436; 370/329
(58) Field of Classification Search
USPC ......... 455/436, 437, 438, 439, 443, 444, 446, 455/447, 448, 451, 452.1, 452.2, 464, 509; 370/329, 330, 331, 332, 341, 436, 437
See application file for complete search history.

(56) References Cited

U.S. PATENT DOCUMENTS

| | | | |
|---|---|---|---|
| 2009/0135790 A1* | 5/2009 | Yavuz et al. ................ | 370/336 |
| 2009/0257390 A1 | 10/2009 | Ji et al. | |
| 2009/0291690 A1 | 11/2009 | Guvenc et al. | |
| 2010/0087203 A1 | 4/2010 | Lee et al. | |
| 2010/0118827 A1 | 5/2010 | Sundaresan et al. | |
| 2010/0118996 A1 | 5/2010 | Sundaresan et al. | |
| 2010/0120438 A1 | 5/2010 | Kone et al. | |
| 2011/0286389 A1* | 11/2011 | Atarius et al. ............... | 370/328 |

FOREIGN PATENT DOCUMENTS

| | | | |
|---|---|---|---|
| KR | 10-2009-0112911 | 10/2009 | |
| KR | 10-2010-0018777 A | 2/2010 | |
| KR | 10-2010-0026919 | 3/2010 | |
| KR | 10-2010-0038558 | 4/2010 | |
| KR | 10-2010-0059353 | 6/2010 | |
| WO | WO2010011166 | * 1/2010 | ............ H04W 16/14 |

OTHER PUBLICATIONS

International Search Report and Written Opinion dated Feb. 6, 2012, in corresponding International Patent Application No. PCT/KR2011/0005905.

* cited by examiner

*Primary Examiner* — Phuoc Doan
(74) *Attorney, Agent, or Firm* — NSIP Law

(57) ABSTRACT

A method and apparatus of controlling resources of a femto base station for protecting a macro terminal and controlling interference among femto base stations are provided. The femto base station or a gateway of the femto base station may allocate resource blocks of a femto cell based on a silencing resource block for protecting the macro terminal. Also, the femto base station or the gateway of the femto base station may allocate the resource block of the femto cell based on a relative location between the macro base station and the femto base station and a victim macro terminal. The femto base station or the gateway of the femto base station may allocate the resource block of the femto cell based on a resource block used by a neighboring femto base station.

23 Claims, 14 Drawing Sheets

——— SIGNAL FROM MACRO BASE STATION
------ INTERFERENCE FROM MACRO BASE STATION
—·— SIGNAL FROM FEMTO BASE STATION
········· INTERFERENCE FROM FEMTO BASE STATION

METHOD AND APPARATUS OF CONTROLLING RESOURCE OF FEMTO BASE STATION FOR PROTECTING INTERFERENCE VICTIM TERMINAL AND CONTROLLING INTERFERENCE AMONG FEMTO BASE STATIONS

CROSS-REFERENCE TO RELATED APPLICATION(S)

This application claims the benefit under 35 U.S.C. §119 (a) of Korean Patent Application No. 10-2010-0078326, filed on Aug. 13, 2010, in the Korean Intellectual Property Office, the entire disclosure of which is incorporated herein by reference for all purposes.

BACKGROUND

1. Field

The following description relates to a method and apparatus of controlling resources of a femto base station for protecting an interference victim terminal in a hierarchical cell communication system and of controlling interference among femto base stations.

2. Description of Related Art

As various wireless communication technologies and devices continue to be introduced, demands for wireless communication have increased. The increased demands cause a lack of limited frequency resources, resulting in an increase in demand for more effectively use of the frequency resources.

A hierarchical cell environment denotes an environment in which relatively small cells formed by base stations are constructed within a macro cell, in a form of a self organizing network. Examples of the relatively small cells formed by the base stations include a relay cell, a femto cell, a pico cell, a cell formed by a Home Node-B (HNB), a cell formed by a Home enhanced Node-B (HeNB), a cell formed by a remote radio head (RRH), and the like.

In a hierarchical cell communication system using the femto cells, problems may arise such as a dead-zone or coverage hole in which Quality of Service (QoS) of a macro user is deteriorated due to interference from the femto cells.

To overcome a dead-zone, a method of reducing the interference through vertical handover between the femto cell and the macro cell may be applied. However, in the method of vertical handover, an amount of overhead influencing the entire communication system may be significant in terms of a user's mobility.

Another method of overcoming a dead-zone includes reducing the interference between the macro cell and the femto cell through resource partition.

SUMMARY

In one general aspect, there is provided a communication method of a femto base station in a hierarchical cell communication system including a macro base station, a femto base station, and a neighboring femto base station, the communication method including receiving information associated with a silencing resource block of the femto base station, including information for protecting a macro terminal from interference generated in the macro terminal corresponding to the macro base station due to the femto base station, determining at least one of an available resource block of the femto base station according to the information associated with the silencing resource block, determining at least one of a target resource block of the femto base station according to the at least one resource block used by the neighboring femto base station, and serving the femto terminal using the at least one of the target resource block, wherein the at least of the target resource block of the femto base station is included within the resource blocks of the at least one resource block of the femto base station.

The information associated with the silencing resource block of the femto base station may include at least one selected from the group of a method of determining a resource block on which the femto base station is to perform a silencing, a resource block on which the femto base station is to first perform a silencing, a resource block on which a silencing is to be performed, and any combination thereof.

The determining of the at least one of the available resource block of the femto base station may determine the at least one of the available resource block of the femto base station according to a distance between the macro base station and the femto base station.

The determining of the at least one of the target resource block of the femto base station according to the at least one resource block used by the neighboring femto base station may further include determining the at least one of the target resource block of the femto base station based on a power of a signal received from the neighboring femto base station.

The determining of the at least one of the target resource block of the femto base station according to the at least one resource block used by the neighboring femto base station may further include determining the at least one of the target resource block of the femto base station according to a predefined rule for reducing a number of the resource blocks overlapped with the at least one of the resource block used by the neighboring femto base station.

The communication method may further include receiving at least one of information selected from the group of information about the macro terminal corresponding to the macro base station, information about the femto terminal corresponding to the femto base station, information about the neighboring femto terminal corresponding to the neighboring femto base station, and any combination thereof; and updating the at least one of the available resource block of the femto base station and the at least one of the target resource block of the femto base station, based on the received information.

The receiving may further include receiving, from one of the macro base station and the neighboring femto base station via a wireless channel, one of the information about the macro terminal corresponding to the macro base station and the information about the neighboring femto terminal corresponding to the neighboring femto base station.

The receiving may further include directly receiving, from the macro terminal corresponding to the macro base station, one of the information about the macro terminal and the information about the femto terminal corresponding to the femto base station.

The receiving may further include receiving, from a gateway of one of the macro base station or the femto base station via a wired backhaul channel, one of the information about the macro terminal corresponding to the macro base station and the information about the neighboring femto terminal corresponding to the neighboring femto base station.

The updating may further include updating the at least one of the available resource block of the femto base station and the at least one of the target resource block of the femto base station, based on one of a number of the macro terminals corresponding to the macro base station and a number of the neighboring femto terminals corresponding to the neighboring femto base station, wherein each of the number of the macro terminals corresponding to the base station and each of the number of neighboring terminals corresponding to the neighboring femto base station is interfered with by the femto base station.

The updating may further include updating the at least one of the available resource block of the femto base station and the at least one of the target resource block of the femto base station based on a Quality of Service (QoS) of the femto terminal corresponding to the femto base station.

The receiving of the information associated with the silencing resource block may further include receiving the information associated with the silencing resource block of the femto base station according to a broadcast scheme or a multicast scheme.

In another general aspect, there is provided a communication method of a macro base station in a hierarchical cell communication system, the communication method including setting a first femto group, the first femto group including at least one of a first femto base station, a second femto group, the second femto group including at least one of a second femto base station, receiving, from a first macro terminal adjacent to the first femto group, Channel State Information (CSI) of the first macro terminal, receiving, from a second macro terminal adjacent to the second femto group, CSI of the second macro terminal, determining a silencing resource block of the first femto group and a silencing resource block of the second femto group based on the CIS of the first macro terminal and the CSI of the second macro terminal, and transmitting information about the silencing resource block of the first femto group and information about the silencing resource block of the second femto group.

The communication method of the macro base station may further include serving the first macro terminal using the silencing resource block of the first femto group and serving the second macro terminal using the silencing resource block of the second femto group.

The determining may further include determining the silencing resource block of the first femto group and the silencing resource block of the second femto group such that an overlap of the silencing resource block of the first femto group and the silencing resource block of the second femto group is substantially minimized.

In another general aspect, there is provided a communication device in a hierarchical cell communication system including a macro base station, a femto base station, and a neighboring femto base station, the communication device including a receiving unit to receive information associated with a silencing resource block of the femto base station for protecting a macro terminal from interference occurring at the macro terminal due to the femto base station, a determination unit to determine at least one of an available resource block of the femto base station according to the information associated with the silencing resource block, and to determine at least one of a target resource block of the femto base station according to the at least one of the resource block used by the neighboring femto base station, and a processing unit to process the at least one of the target resource block to facilitate communication between the femto terminal and the femto base station, wherein the at least of the target resource block of the femto base station is included within the resource blocks of the at least one resource block of the femto base station.

The receiving unit may receive the information associated with the silencing resource block of the femto base station including at least one selected from the group of a method of determining a resource block on which the femto base station is to perform a silencing, a resource block on which the femto base station is to first perform a silencing, a resource block on which a silencing is to be performed, and any combination thereof.

The determination unit may determine the at least one of the available resource block of the femto base station according to a distance between the macro base station and the femto base station.

The determination unit may determine the at least one of the target resource block of the femto base station according to a power of a signal transmitted from the neighboring femto base station to the femto base station.

The determination unit may determine the at least one of the target resource block of the femto base station according to a predefined rule for reducing a number of the resource blocks overlapped with the at least one of the resource block used by the neighboring femto base station.

The receiving unit may receive at least one of information selected from the group of information about the macro terminal corresponding to the macro base station, information about the femto terminal corresponding to the femto base station, information about the neighboring femto terminal corresponding to the neighboring femto base station, and any combination thereof, and the communication device may further include an updating unit to update the at least one of the available resource block of the femto base station and the at least one of the target resource block of the femto base station, based on the received information.

The updating unit may update the at least one of the available resource block of the femto base station and the at least one of the target resource block of the femto base station, based on one of a number of the macro terminals corresponding to the macro base station and a number of the neighboring femto terminals corresponding to the neighboring femto base station, each being interfered with by the femto base station.

The updating unit may update the at least one of the available resource block of the femto base station and the at least one of the target resource block of the femto base station based on a QoS of the femto terminal corresponding to the femto base station.

According to one example, a macro terminal victimized by a femto cell may be protected by adaptively allocating a resource block of the femto cell based on a silencing resource block for protecting the macro terminal, a distance between a macro base station and a femto base station, and a victim macro terminal.

According to another example, interference among femto cells may be controlled to improve cell average/edge throughput and to protect a femto terminal victimized by a femto cell by determining a resource block used for serving the femto terminal by a femto base station, based on a resource block used by a neighboring femto base station.

According to another example, a hierarchical cell communication system may prepare for the presence of a victim due to interference prior to the occurrence of the victim, thereby reducing overhead of the entire communication system and enhancing stability, by adaptively determining a degree of resource utilization according to an ambient communication environment by each femto base station. Also, it may be possible to continuously enhance stability of the entire communication system by determining a degree of resource utilization based on a victim state due to the interference.

According to another example, a degree of resource utilization while protecting a macro terminal adjacent to each femto cell group may be improved by determining a silencing resource block for each femto cell group by a macro base station.

Other features and aspects may be apparent from the following detailed description, the drawings, and the claims.

Figure 1:
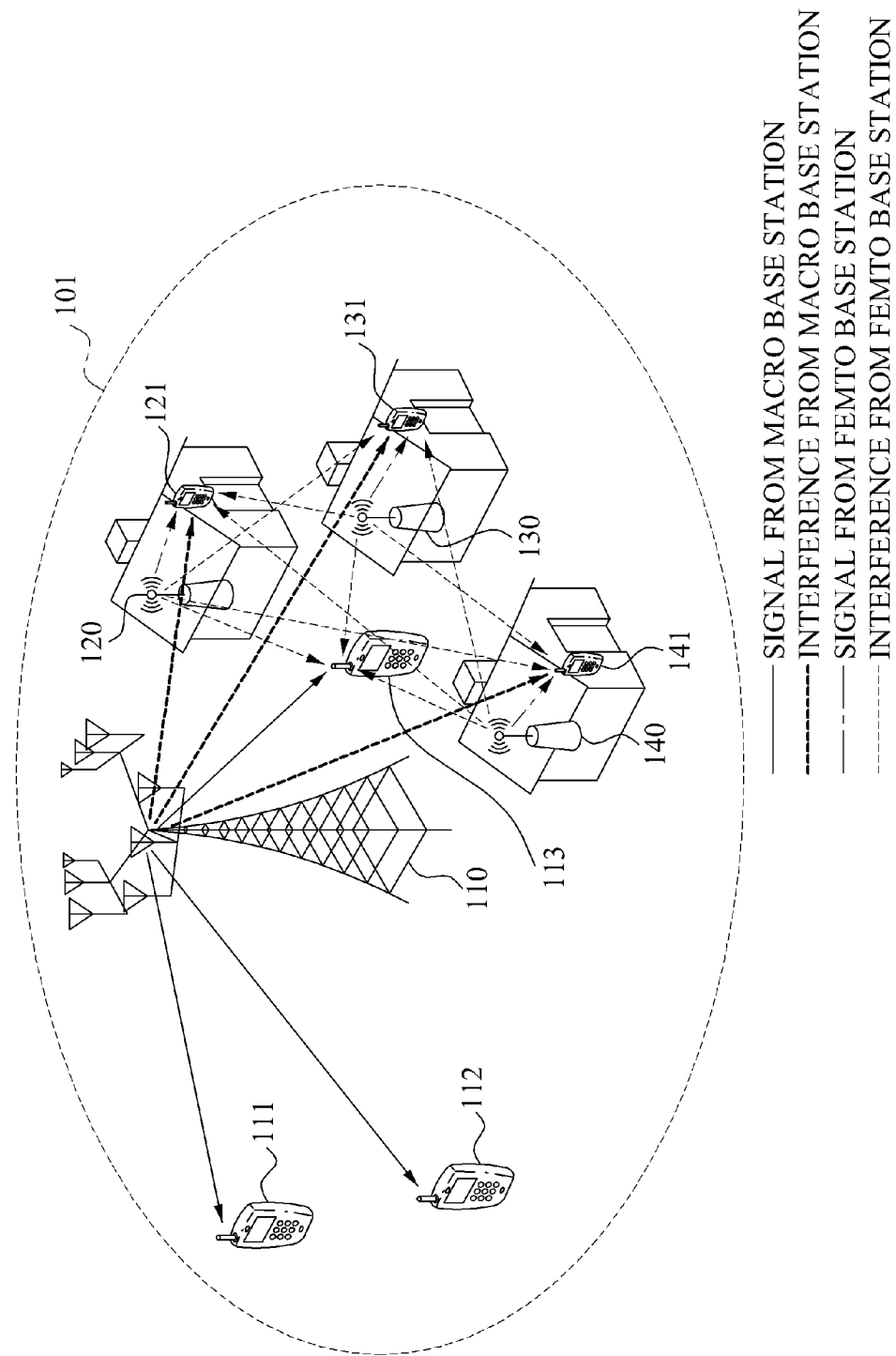
FIG. 1 is a diagram illustrating interference received from a macro base station and a femto base station by a macro terminal and a femto terminal in a hierarchical cell communication environment where a macro cell and a femto cell exist.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining an understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

Examples described below provide a resource allocation method that may 1) improve Quality of Service (QoS) of a victim macro terminal in a communication environment where a macro cell and at least one of a femto cell co-exist, and 2) obtain a cell splitting gain by controlling interference among the femto cells.

In the examples described below, the femto cell may be a relay cell, a femto cell, or a pico cell. Thus, definition of each of a femto base station and a femto terminal may expand to correspond to the femto base station. For example, the femto base station may be a Home Node-B (HNB), a Home enhanced Node-B (HeNB), a remote radio head (RRH), or an Access Point (AP).

FIG. 1 is a diagram illustrating interference received from a macro base station 110 and a femto base station by a macro terminal and a femto terminal in a hierarchical cell communication environment where a macro cell 101 and a femto cell exist.

Referring to FIG. 1, the macro cell 101 for serving macro terminals 111, 112, and 113 by the macro base station 110 is illustrated. In the macro cell 101, a femto base station (1) 120, a femto base station (2) 130, and a femto base station (3) 140 may be present. Also, a femto terminal (1) 121, a femto terminal (2) 131, and a femto terminal (3) 141, respectively corresponding to the femto base stations 120, 130, and 140, may be present.

Signals and interference from the macro base station 110 and the femto base stations 120, 130, and 140 are illustrated by various types of lines in FIG. 1.

The macro terminal (1) 111 and the macro terminal (2) 112 are located relatively far away from the femto base stations 120, 130, and 140, and do not receive significant interference from the femto base stations 120, 130, and 140.

However, a victim macro terminal 113 is located relatively close to the femto base stations 120, 130, and 140, and receives significant interference from the femto base stations 120, 130, and 140. In this example, the victim macro terminal 113 may assume that handover from the macro base station 110 to the femto base stations 120, 130, and 140 is not allowed.

According to this example, in order to secure sufficient QoS of the victim macro terminal 113, the femto base stations 120, 130, and 140 may perform a silencing on a Resource Block (RB) such that the victim macro terminal 113 receives services from the macro base station 110. The femto terminals 121, 131, and 141 may be serviced using the remaining RBs.

The RB is a wireless resource allocation unit that can be set in a frequency domain and/or a time domain, and includes all rules defined for a general communication protocol. According to one example, for convenience of the description, the wireless resource allocation unit may be standardized as the resource block, which will be described later herein. That is, the resource block may be a minimum unit of a time resource or a frequency resource.

In the hierarchical cell communication environment, various types of interference states may exist. For example, various interference states may be present in accordance with a number of the macro terminals receiving interference from the femto base station, a distance between the femto base stations and the macro base station, or a distance between the femto base stations (that is, whether the femto base stations are densely or sparsely distributed).

According to one example, resource blocks of the macro terminals and the femto base stations may be adaptively allocated based on the various interference states.

As a further example, the femto base stations may determine available resource blocks ($\alpha$) in accordance with a relative location with respect to the macro base station and the femto base stations. That is, $\alpha$ may be included in a region except for resource blocks ($\eta$) on which the femto base stations are to perform a silencing for the macro terminal.

As another example, a target femto base station may determine a number of target resource blocks used for serving a target femto terminal within the available resource blocks ($\alpha$) based on a power of signals transmitted to the target femto base station from neighboring femto base stations. Also, a pattern of the target resource block used for serving the femto terminal may be determined.

Hereinafter, an example of allocating the resource block for each of the various interference states will be described with reference to FIGS. 2 to 6.

Figure 2:
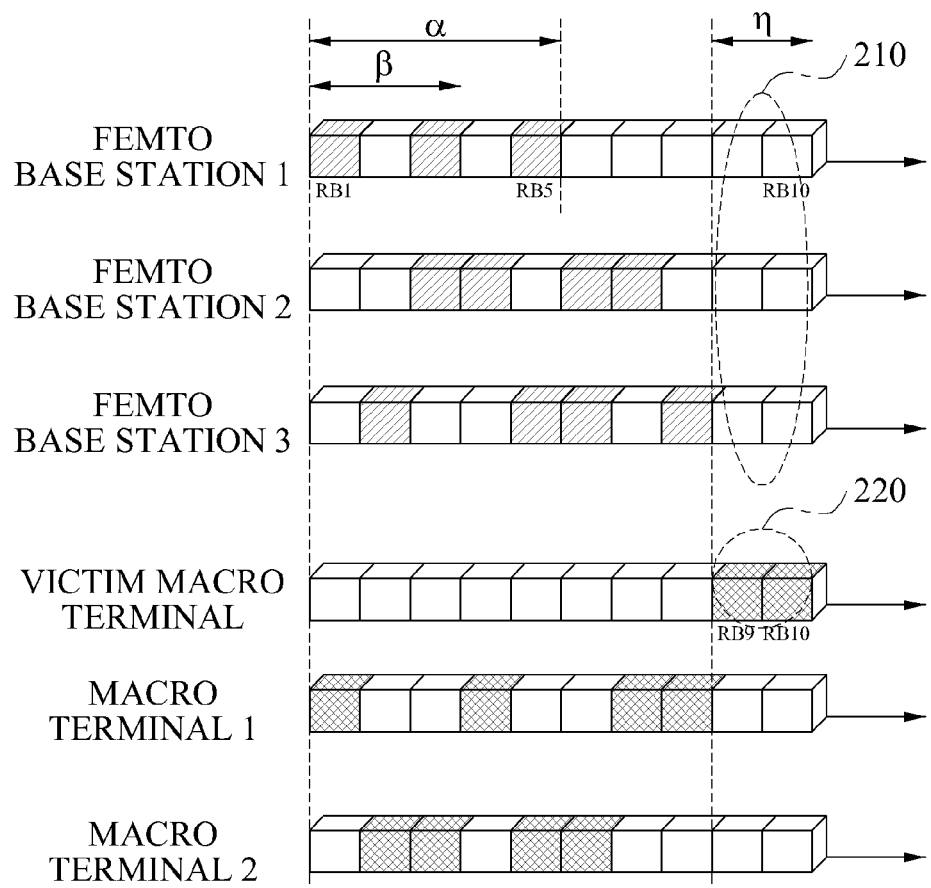
FIG. 2 is a diagram illustrating an example of resource block allocation where a distance between a macro base station and femto base stations is relatively short and the femto base stations are densely distributed.

FIG. 2 is a diagram illustrating an example of resource block allocation where a distance between a macro base station and femto base stations is relatively short and the femto base stations are densely distributed.

Referring to FIG. 2, the femto base stations, that is, femto base stations 1 to 3, do not use a resource block corresponding to $\eta$ for the victim macro terminal. When $\eta$ is determined, the femto base stations may use resource blocks except for $\eta$. According to one example, when $\eta$ is not determined, the femto base stations may determine the available resource blocks ($\alpha$).

$\alpha$ includes RB1 to RB5 in the femto base station 1, whereas $\alpha$ includes RB1 to RB8 in the femto base station 3, such that a region of the available resource blocks in the femto base station 3 is wider than that of the femto base station 1. The femto base stations may serve the femto terminals corresponding to the femto base stations within $\alpha$ of each of the femto base stations.

Thus, the macro base station may serve the victim macro terminal using $\eta$, that is, the resource block may not be used by the femto base stations. The macro base station may serve the macro terminals 1 and 2 that receive insignificant interference from the femto base stations, using the resource block except for RB9 and RB10 210 corresponding to $\eta$. The macro base station may serve the victim macro terminal using RB9 and RB10 220, and serve the macro terminals 1 and 2 using RB1 to RB8.

Due to resource block utilization carried out as described above, the interference received at the victim macro terminal from the femto base stations may be reduced, resulting in improvement in QoS of the victim macro terminal.

In the example illustrated in FIG. 2, when the femto base station 1, the femto base station 2, and the femto base station 3 are included in a gateway of the same femto base station, the femto base station 1, the femto base station 2, and the femto base station 3 may not use the same resource block, or may substantially minimize use of the same resource block, thereby reducing interference among the femto base stations. The reduction of the interference between the femto base stations may be associated with $\beta$, which will be further described later herein.

The resource blocks with respect to $\alpha$, $\beta$, or $\eta$ may be continuous or discontinuous resource blocks, and a type and location of $\alpha$, $\beta$, or $\eta$ may be time variable or time invariable.

Also, for the convenience of the description, the resource blocks have been one-dimensionally described, however, the resource blocks may be two-dimensionally distributed. In the case of the two-dimension, a horizontal axis may indicate time resources, and a vertical axis may indicate frequency resources. Thus, the horizontal axis may indicate frequency resources, and the vertical axis may indicate time resources.

Method of Determining $\alpha$

In the above described resource utilization method, a degree of resource utilization of the macro base station and the femto base stations may vary with respect to $\alpha$. According to one example, $\alpha$ may be determined based on 1) a relative location (that is, distance, between the femto base station and the macro base station) or 2) a number of victim macro terminals. Also, $\alpha$ may be determined based on an intensity of signals of the macro base station, an intensity of signals of the femto base station, a number of victim macro terminals, a number of neighboring femto base stations, and ambient interference environment information including a Signal to Interference plus Noise Ratio (SINR), QoS, and the like.

Since the femto base station is typically installed by a user, the femto base station may be installed relatively close to the macro base station, or installed relatively far away from the macro base station. The femto base station may obtain information regarding the relative location with respect to the femto base station and the macro base station by measuring an intensity of signals received from the macro base station, such as Reference Signal Received Power (RSRP), Reference Signal Received Quality (RSRQ), Receive Signal Strength Indicator (RSSI), Reference Signal Power, Pilot Strength, Received Interference Power, and the like. According to one example, for the convenience of the description, the intensity of the received signals may be standardized as RSRP, which will be described later herein.

Based on the measured RSRP, $\alpha$ may be determined to be relatively large when the RSRP from the macro base station increases, and $\alpha$ may be determined to be relatively small when the RSRP decreases. Since an intensity of signals received from the macro base station by the victim macro terminal is relatively large when the RSRP is high, services may be sufficiently provided even using a small number of the resource blocks. However, the intensity of signals received from the macro base station by the victim macro terminal is relatively small when the RSRP is low (such as when the macro terminal is positioned in an edge of a corresponding cell), and thereby a larger number of the resource blocks may be allocated to the victim macro terminal Accordingly, when the RSRP is low, a greater number of the resource blocks may be allocated to the victim macro terminal by reducing $\alpha$ of the femto base stations and increasing $\eta$ of the femto base stations.

Here, the relative location between the femto base station and the macro base station may be estimated according to the RSRP by measuring the intensity of the received signals, estimated by utilizing information registered on network information, or estimated using global positioning system (GPS).

As another factor of determining $\alpha$, a number of victim macro terminals may be present near the femto base station. That is, when the number of the victim macro terminals is relatively large, $\alpha$ of the femto base stations may be reduced so that the macro base station can substantially equally and simultaneously serve the victim macro terminals.

Accordingly, for the macro base station to service the victim macro terminal while securing QoS of at least a predetermined level, the femto base stations may determine a number of the available resource blocks $\alpha$ for serving femto terminals corresponding to the femto base stations, based on the RSRP from the macro base station that is measured by the femto base stations and the number of the victim macro terminals. A method of obtaining information about the number of the victim macro terminals will be described later herein.

Method of Determining $\beta$ and Resource Block Pattern

When femto cells are densely installed, the entire cell average performance may be reduced due to interference among the femto cells as well as interference among the victim macro terminals. The reduction in the entire cell average performance may be due to a cell splitting gain reduced according to interference among the femto cells. Accordingly, a method of allocating resources of the femto base station for the victim macro terminal may be considered; however, a resource allocation scheme capable of controlling the interference among the femto base stations may be also considered.

According to an embodiment, to mitigate the interference among the femto cells, a resource randomization scheme may be applied.

Each of the femto base stations may estimate information regarding the relative location between each of the femto base stations and neighboring femto base stations by measuring an RSRP from the neighboring femto base stations. Each of the femto base stations may verify which resource blocks are used by the neighboring femto base station by measuring the RSRP from the neighboring femto base stations. Thus, according to one example, each of the femto base stations may use the RSRP information from the neighboring base stations and $\alpha$ to determine a number of target resource blocks ($\beta$) used for serving femto terminals, corresponding to each of the femto base stations. That is, $\beta$ may be determined with respect to $\alpha$.

When $\beta$ is determined, a resource block pattern for the resource blocks corresponding to $\beta$ may be determined. Each of the femto base stations may use a predetermined pattern, or receive from a resource block pattern through a gateway of the femto base station, so that a number of the resource blocks overlapping with the neighboring femto base stations can be minimized.

Method of Determining $\eta$ $\eta$ may include resource blocks except for the largest $\alpha$ ($=\alpha_{max}$) among $\alpha$'s of each of the femto base stations having an interference relation with the macro base station. That is, since the femto base stations perform a silencing on resource blocks except for $\alpha_{max}$, the macro base station may serve the victim macro terminal using the resource blocks.

$\eta$ may be determined by the macro base station based on Channel State Information (CSI) of the victim macro terminal prior to $\alpha$ of each of the femto base stations being determined. Accordingly, the femto base stations or a gateway of each of the femto base stations may determine resource blocks, except for $\eta$, as $\alpha$.

Referring to FIG. 2, $\eta$ (that is, the resource blocks on which the femto base stations perform the silencing) corresponds to RB9 and RB10 210. Accordingly, FIG. 2 may correspond to an example where an RSRP from the macro base station to the femto base stations is relatively large, that is, where a distance between the macro base station and the femto base stations is relatively short. As illustrated in FIG. 2, the femto base station 1 five resource blocks correspond to $\alpha$, which may be considered as relatively small in comparison with other femto base stations, and accordingly may indicate the femto base station 1 is located relatively far away from the macro base station in comparison with the other femto base stations.

As further illustrated in FIG. 2, three resource blocks correspond to $\beta$ (that is, a number of resource blocks used for serving femto terminals of the femto base station 1 by the femto base station 1), which is smaller than the number of resource blocks corresponding to $\alpha$ (five). The resource blocks used for serving the femto terminals within $\alpha$ may be an RB1, an RB2, and an RB5. That is, the resource blocks used for the femto terminals of the femto base station 1 may be allocated in such a manner as to be substantially minimally overlapped with resource blocks used by the femto base station 2 and the femto base station 3. Accordingly, the cell splitting gain may be partially acquired. That is, FIG. 2 corresponds to a case in which the femto base station 1, the femto base station 2, and the femto base station 3 are relatively densely installed.

Figure 3:
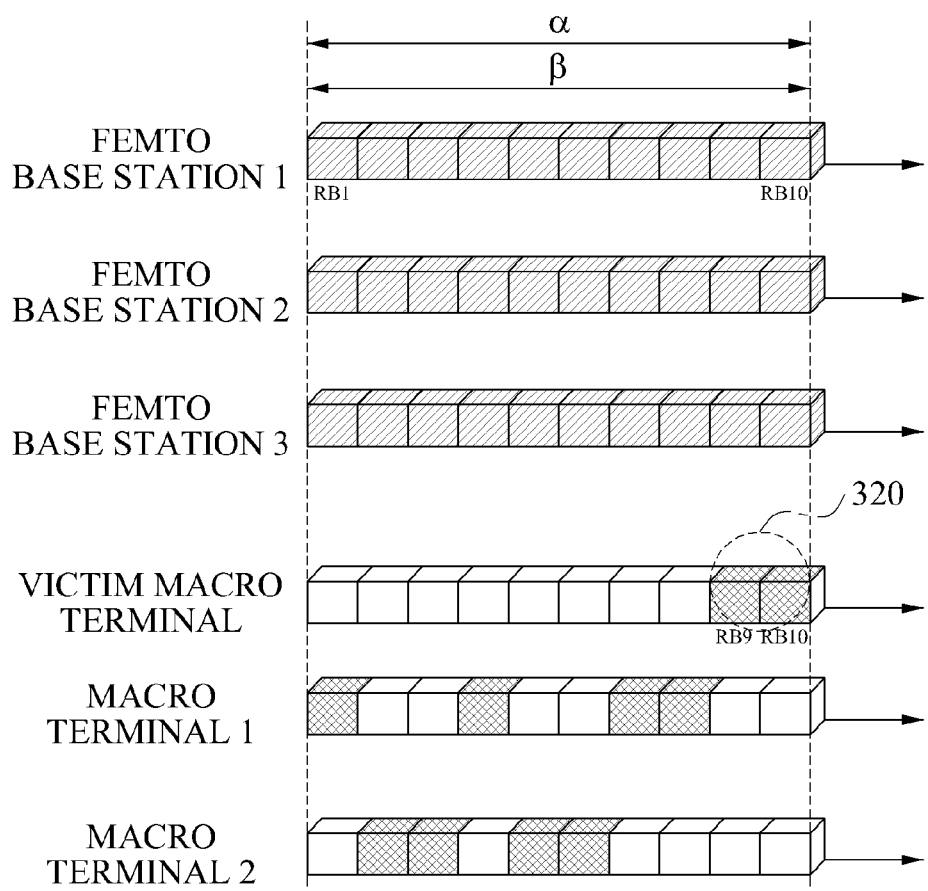
FIG. 3 is a diagram illustrating an example of resource block allocation where a victim macro terminal is not present due to a significantly short distance between a macro base station and femto base stations, and the femto base stations are sparsely distributed.

FIG. 3 is a diagram illustrating an example of resource block allocation where a victim macro terminal is not present due to a significantly short distance between a macro base station and femto base stations, and the femto base stations are sparsely distributed.

Referring to FIG. 3, resource blocks allocated to the macro terminals may be the same as those in FIG. 2. That is, the victim macro terminal may be served from the macro base station using RB9 and RB10 320.

However, since FIG. 3 corresponds to an example where there is no the victim macro terminal (that is, the victim macro terminal receives insignificant interference from the femto base stations), $\alpha$ of all femto base stations may include RB2 through RB10. That is, FIG. 3 corresponds to an example where an RSRP from the macro base station is significantly large.

Referring to FIG. 3, the femto base stations are sparsely distributed. That is, an RSRP from neighboring femto base stations is relatively small. Accordingly, a full cell splitting gain may be obtained by setting $\alpha$ to be equal to $\beta$.

Figure 4:
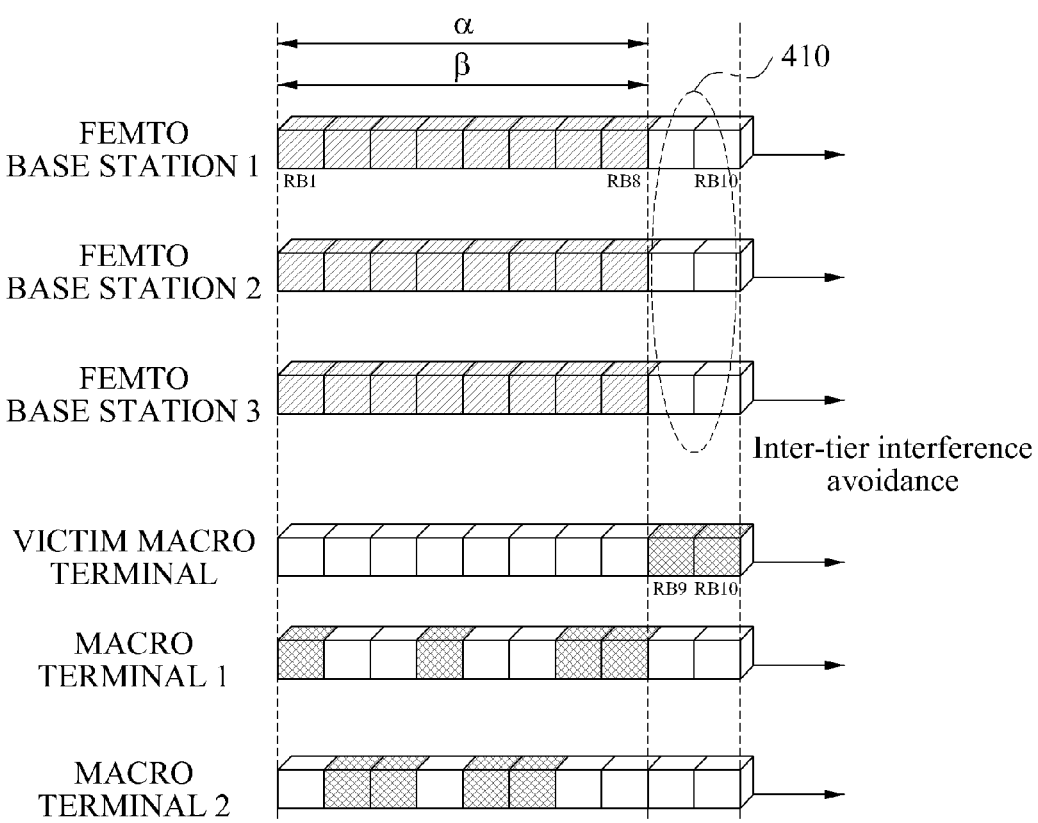
FIG. 4 is a diagram illustrating an example of resource block allocation where a distance between a macro base station and femto base stations is relatively short, and the femto base stations are sparsely distributed.

FIG. 4 is a diagram illustrating an example of resource block allocation where a distance between a macro base station and femto base stations is relatively short, and the femto base stations are sparsely distributed.

Referring to FIG. 4, RB9 and RB10 410, on which the femto base stations perform a silencing, are different from those illustrated in FIG. 3. Referring to FIG. 4, an RSRP from the macro base station is relatively large, however, little interference from the femto base stations to the victim macro terminal is present. Accordingly, the femto base stations may perform a silencing only on a relatively small number of the resource blocks, for example, RB9 and RB10 410.

Referring to FIG. 4, the femto base stations are sparsely distributed. That is, an RSRP from the neighboring femto base station is relatively small. Accordingly, a full cell splitting gain may be obtained by setting $\alpha$ to be equal to $\beta$.

Figure 5:
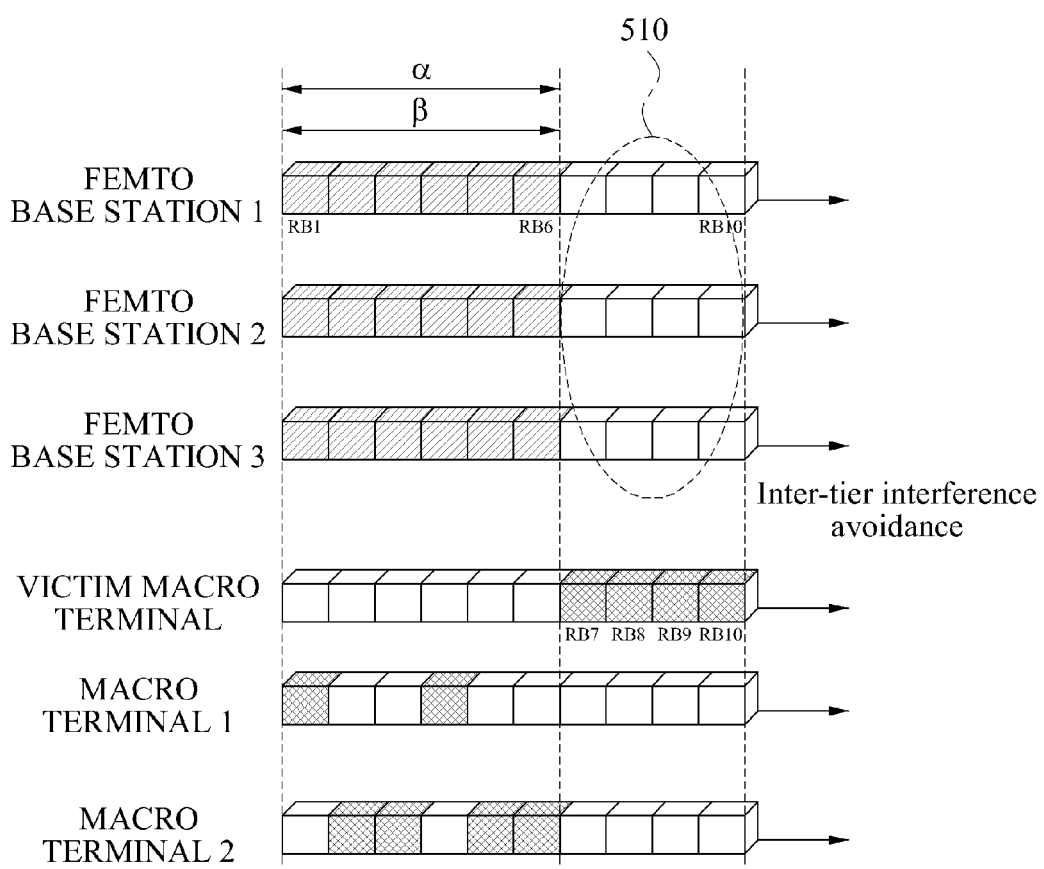
FIG. 5 is a diagram illustrating an example of resource block allocation where a distance between a macro block and femto base stations is relatively long, and the femto base stations are sparsely distributed.

FIG. 5 is a diagram illustrating an example of resource block allocation where a distance between a macro block and femto base stations is relatively long, and the femto base stations are sparsely distributed.

Referring to FIG. 5, the resource blocks are allocated in an example where a distance between the macro block and the femto base stations is relatively long. That is, since an RSRP from the macro base station is relatively small, a number of the resource blocks corresponding to α may be determined to be relatively small. Accordingly, the femto base station may perform silencing on a relatively large number of resource blocks, for example, RB7 to RB10 510. The macro base station may serve the victim macro terminal using RB7 to RB10, thereby securing sufficient QoS of the victim macro terminal. Referring to FIG. 5, the femto base stations are sparsely distributed. That is, an RSRP from the neighboring femto base stations is relatively small. Accordingly, a full cell splitting gain may be obtained by setting α to be equal to β.

Figure 6:
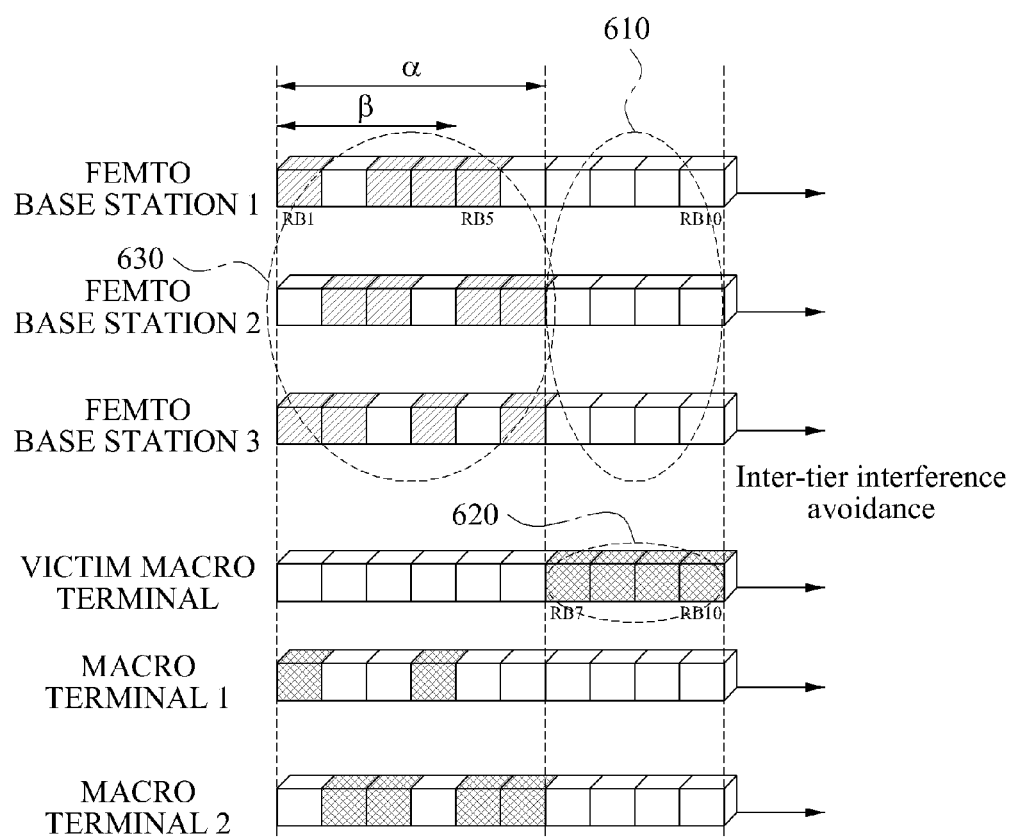
FIG. 6 is a diagram illustrating an example of resource block allocation where a distance between a macro base station and femto base stations is relatively long, and the femto base stations are densely distributed.

FIG. 6 is a diagram illustrating an example of resource block allocation where a distance between a macro base station and femto base stations is relatively long, and the femto base stations are densely distributed.

Referring to FIG. 6, resource blocks are allocated in an example where a distance between the macro base station and the femto base stations is relatively long. That is, since an RSRP from the macro base station is relatively small, a number of the resource blocks corresponding to α may be determined to be relatively small. Accordingly, the femto base stations may perform silencing on a relatively large number of resource blocks, for example, RB7 to RB10 610. The macro base station may serve the victim macro terminal using resource blocks 620 on the femto base stations perform the silencing, thereby securing sufficient QoS of the victim macro terminal.

In addition, referring to FIG. 6, since the femto base stations are densely distributed, an RSRP from the neighboring femto base stations is relatively large. Accordingly, to reduce interference among the femto base stations, β may be determined to be smaller than α.

Each of the femto base stations may determine a pattern of resource blocks according to β, included within resource blocks 630 corresponding to α, so that the resource blocks of the femto base stations are not overlapped with resource blocks used by the neighboring femto base stations to a substantially maximal degree. For example, the femto base station 1 uses an RB1, an RB2, an RB3, and an RB4, and each of the RB1, the RB2, the RB3, and the RB4 is overlapped with the neighboring femto base stations only once, thereby obtaining a partial cell splitting gain.

The macro base station may determine η in advance. Hereinafter, a method of determining η for each femto group will be described.

Figure 7:
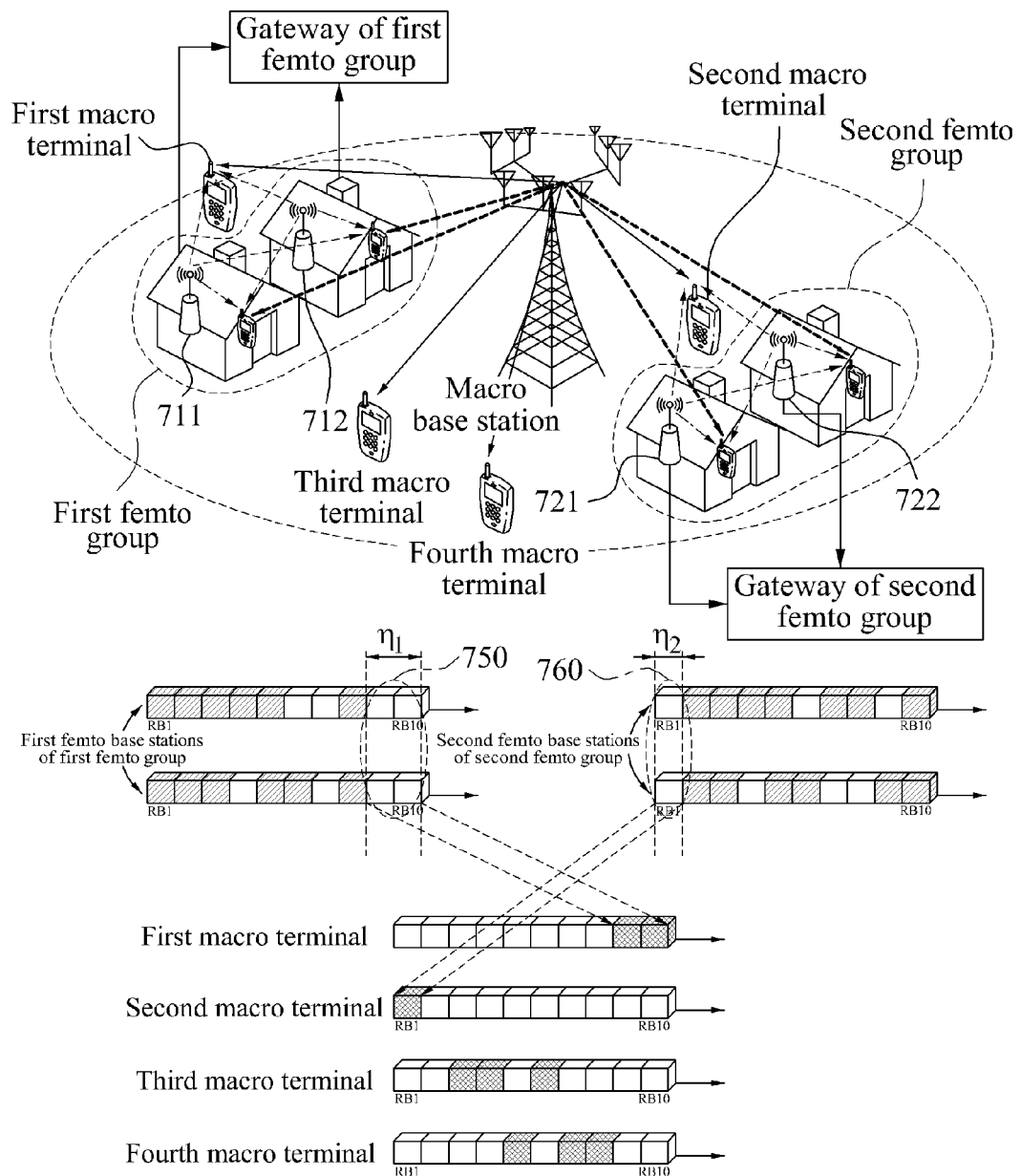
FIG. 7 is a diagram illustrating an example in which a common silencing resource block is allocated for each femto group in an environment where a plurality of femto groups is present within a macro cell.

FIG. 7 is a diagram illustrating an example in which a common silencing resource block is allocated for each femto group in an environment where a plurality of femto groups is present within a macro cell.

Referring to FIG. 7, a macro cell includes a macro base station, a first macro terminal, a second macro terminal, and a third macro terminal. In the macro cell, a first femto group includes first femto base stations 711 and 712 and a second femto group includes second femto base stations 721 and 722. Each of the femto groups may be set by the macro base station. The first femto base stations 711 and 712 may be connected to a gateway of the first femto group, and the second femto base stations 721 and 722 may be connected to a gateway of the second femto group.

The macro base station may receive CSIs from each of the macro terminals. The macro base station determines a resource block 750 on which a silencing is commonly performed by the first femto group, based on the CSIs of each of the macro terminals. The macro base station may also determine a resource block 760 on which a silencing is commonly performed by the second femto group. Subsequently, the determined results are transmitted to each of the femto groups.

The macro base station may schedule resource blocks so that the resource block 750 on which the silencing is performed by the first femto base stations 711 and 712 is included in the first femto group for the first macro terminal adjacent to the first femto group, and the resource block 760 on which the silencing is performed by the second femto base stations 721 and 722 is included in the second femto group for the second macro terminal adjacent to the second femto group. Accordingly, the resource blocks for silencing may be selected so as to not overlap. That is, the macro base station may determine, as RB9 and RB10, a common silencing resource block of the first group for the first macro terminal, and determine, as RB1, a common silencing resource group of the second group for the second macro terminal, and allocate the remaining resource blocks to the third macro terminal and the fourth macro terminal, thereby serving each of the macro terminals without overlapped resource blocks.

The macro base station may determine the silencing resource block for each femto group based on resource block preference of the macro terminal adjacent to a corresponding femto group.

Hereinafter, methods of a communication system according to one example are described using flowcharts of FIGS. 8 to 13.

Figure 8:
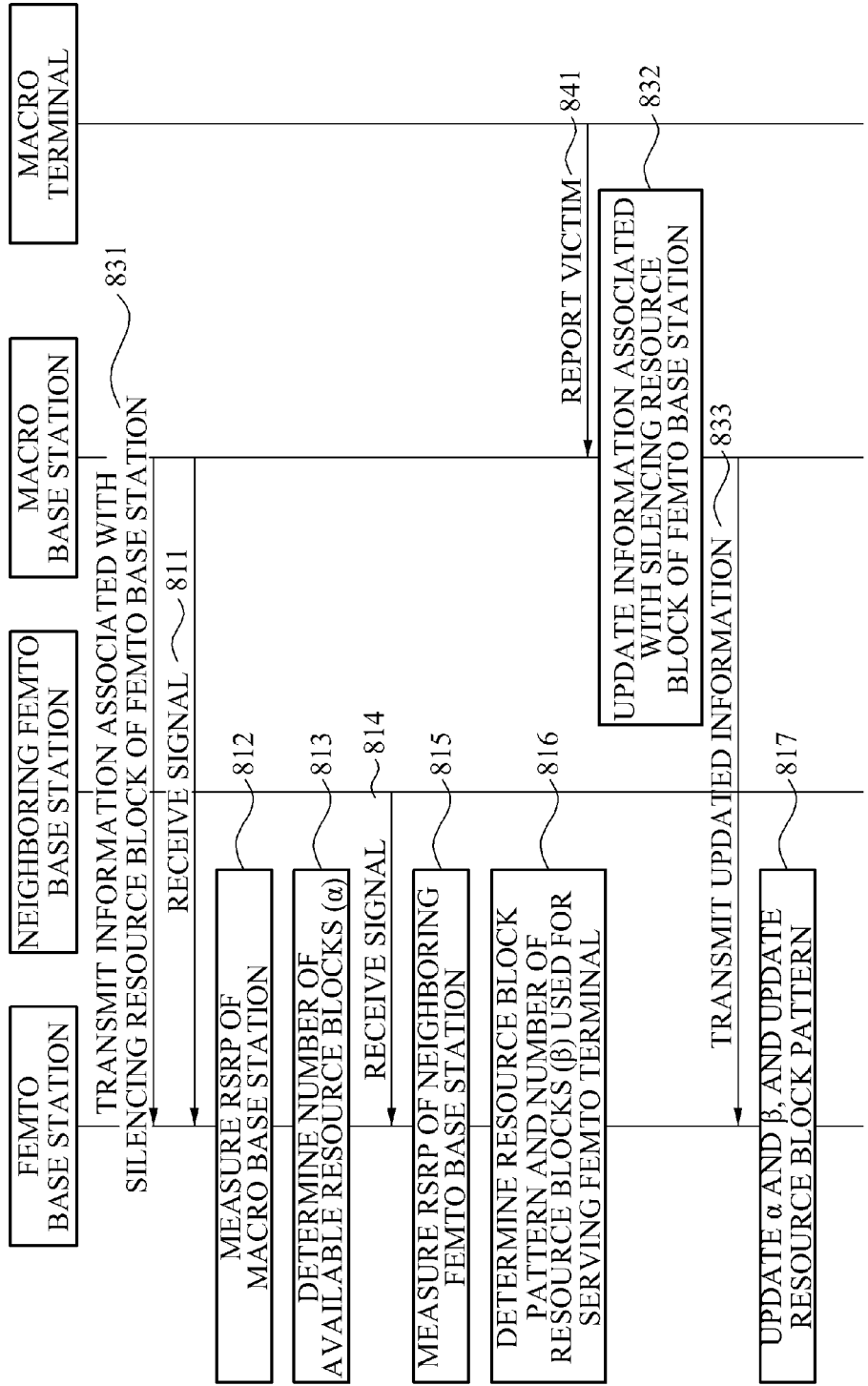
FIG. 8 is a flowchart illustrating a method of a femto base station allocating a resource block based on information received from a macro base station.

FIG. 8 is a flowchart illustrating a method of a femto base station allocating a resource block based on information received from a macro base station.

In operation 831, the macro base station transmits, to the femto base station, information associated with a silencing resource block of the femto base station. The information associated with the silencing resource block of the femto base station may include a method of determining a resource block (η) on which the femto base station is to perform silencing, a resource block on which the femto base station is to first perform the silencing, or a resource block (η) on which the silencing is to be performed. The information associated with the silencing resource block of the femto base station may include information regarding a predefined rule for reducing a number of resource blocks overlapped with at least one of the resource block used by the neighboring femto base station. Here, the predefined rule may be associated with a cell ID structure of the femto cell. The information associated with the silencing resource block of the femto base station may be transmitted via a wired or wireless connection.

In operation 812, the femto base station may measure an RSRP of the macro base station based on a signal 811 received from the macro base station. The femto base station may measure the RSRP of the macro base station based on the signal received from the macro base station by the femto terminal corresponding to the femto base station. Accordingly, the femto base station may acquire an RSRP of the macro base station by receiving information regarding the RSRP from the macro base station measured by the femto terminal. In operation 813, the femto base station may determine available resource blocks a of the femto base station based on the RSRP of the macro base station and the information associated with the silencing resource block of the femto base station.

In operation 815, the femto base station or the femto terminal corresponding to the femto base station may measure an RSRP of a neighboring femto base station based on a signal 814 received from the neighboring femto base station. The femto terminal corresponding to the femto base station may measure the RSRP of the neighboring femto base station based on the signal received from the neighboring femto base station. Accordingly, the femto base station may acquire the RSRP of the neighboring femto base station by receiving the RSRP of the neighboring femto base station measured by the femto terminal. In operation 816, a number of resource blocks β used for serving the femto terminal and a resource block pattern may be determined based on the RSRP of the neighboring femto base station. That is, the femto base station may determine the resource block used for serving the femto terminal of the femto base station based on the power of a signal received from the neighboring femto base station with respect to each resource block used by the neighboring femto base station. The femto base station may determine the resource block pattern of the femto base station so that the resource blocks used by the femto base station and the neighboring femto base stations are substantially orthogonal to each other.

In operation 841, the macro base station may receive, from the macro terminal, a victim report regarding a victim state including interference due to the femto base station, CSI, and the like.

In operation 832, the macro base station may update information associated with the silencing resource block of the femto base station based on the victim report from the macro terminal. That is, the macro base station may change η based on the victim report.

In operation 833, the macro base station may transmit, to the femto base station, updated information associated with the silencing resource block of the femto base station. The information associated with the silencing resource block may be transmitted to a large number of femto base stations in a multicast or a broadcast manner. The information associated with the silencing resource block may include information regarding α and β, and may be transmitted to each of the femto base stations in a unicast manner.

In operation 817, the femto base station may update α, β, and the resource block pattern based on the updated information associated with the silencing resource block of the femto base station. The femto base station may update α and β and the resource block pattern based on QoS of the femto terminal corresponding to the femto base station.

In the above description of FIG. 8, the femto base station has been mainly described; however, the above described method may be applied to the neighboring femto base station in a similar manner. Also, the femto base station and the neighboring femto base station may be included in a single femto group, and a similar method may be applied to other femto groups. The macro base station may generate the information associated with the silencing resource block of the femto base station so that the silencing resource blocks for each femto group are not overlapped with each other, as described with respect to FIG. 7.

Figure 9:
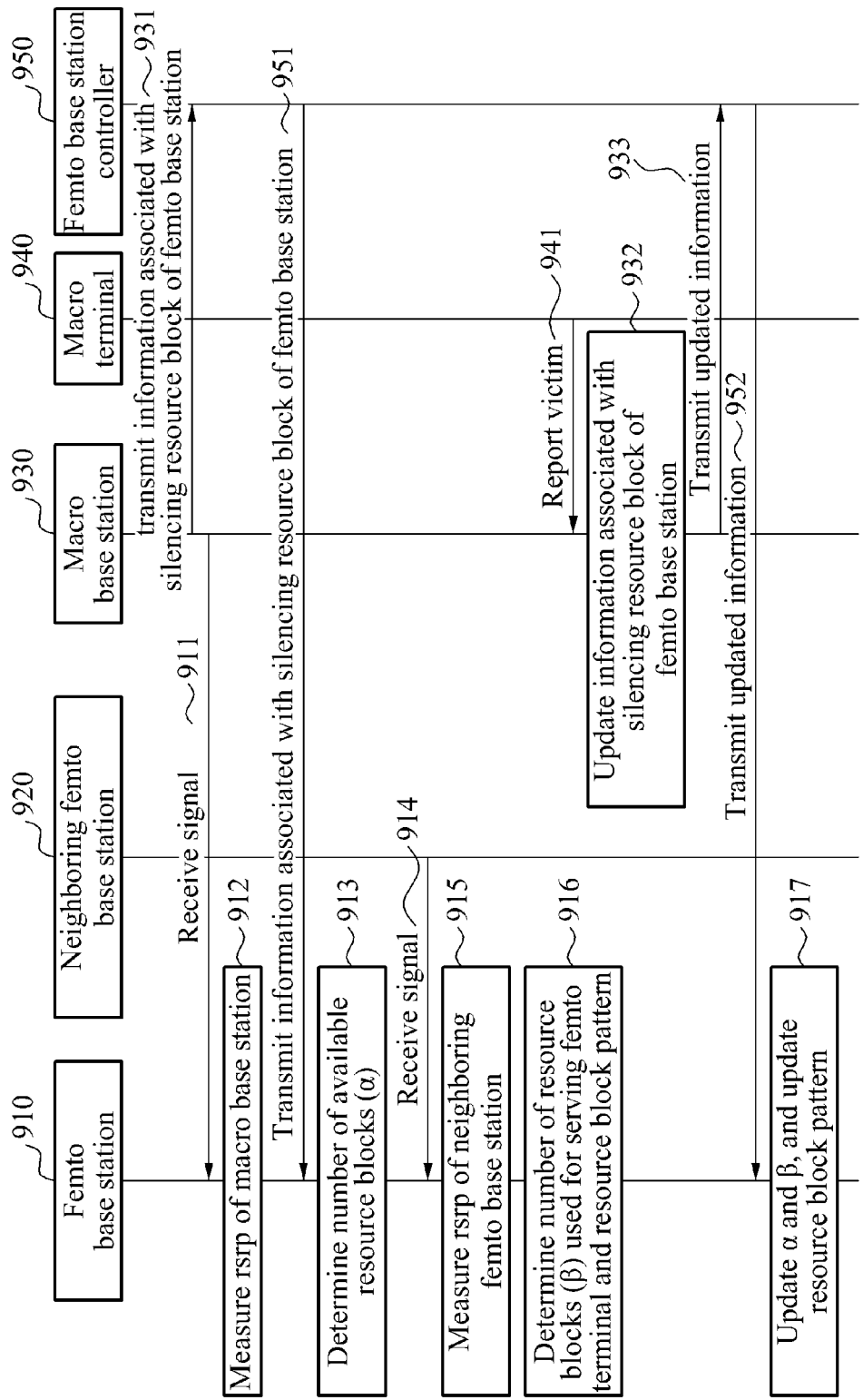
FIG. 9 is a flowchart illustrating a method of a femto base station allocating a resource block based on information received from a femto base station controller.

FIG. 9 is a flowchart illustrating a method of a femto base station allocating a resource block based on information received from a femto base station controller.

Referring to FIG. 9, the femto base station does not directly receive, from the macro base station, information associated with the silencing resource block of the femto base station. Instead, the femto base station receives the information via a femto base station controller. The femto base station controller may be a gateway connected to the femto base station. Other portions except for the described feature of the femto base station controller may be analogous to corresponding portions in the method described with reference to FIG. 8 and thus, are omitted herein for brevity and clarity.

In operation 931, the macro base station may transmit, to the femto base station controller, information associated with a silencing resource block of the femto base station. The information associated with a silencing resource block of the femto base station may be transmitted via a wired or wireless connection.

In operation 912, the femto base station may measure an RSRP of the macro base station based on a signal 911 received from the macro base station. The femto base station may measure the RSRP of the macro base station based on the signal received from the macro base station by the femto terminal corresponding to the femto base station. Accordingly, the femto base station may acquire the RSRP of the macro base station by receiving information regarding the RSRP from the macro base station measured by the femto terminal.

In operation 951, the femto base station controller may transmit, to the femto base station, information associated with the silencing resource block of the femto base station.

In operation 913, the femto base station may determine available resource blocks α of the femto base station based on the RSRP of the macro base station and the information associated with the silencing resource block of the femto base station.

In operation 915, the femto base station may measure an RSRP of a neighboring femto base station based on a signal 914 received from the neighboring femto base station. In operation 916, the femto base station may determine a number of resource blocks β used for serving the femto terminal and a resource block pattern based on the RSRP of the neighboring femto base station.

In operation 941, the macro base station may receive, from the macro terminal, a victim report regarding a victim state including interference due to the femto base station, CSI, and the like.

In operation 932, the macro base station may update the information associated with the silencing resource block of the femto base station based on the victim report from the macro terminal.

In operation 933, the macro base station may transmit, to the femto base station controller, updated information associated with the silencing resource block of the femto base station. In operation 952, the femto base station controller may transmit, to the femto base station, the information associated with the silencing resource block of the femto base station.

In operation 917, the femto base station may update α, β, and the resource block pattern based on the updated information associated with the silencing resource block of the femto base station. Also, the femto base station may update α, β, and the resource block pattern based on QoS of the femto terminal corresponding to the femto base station.

Figure 10:
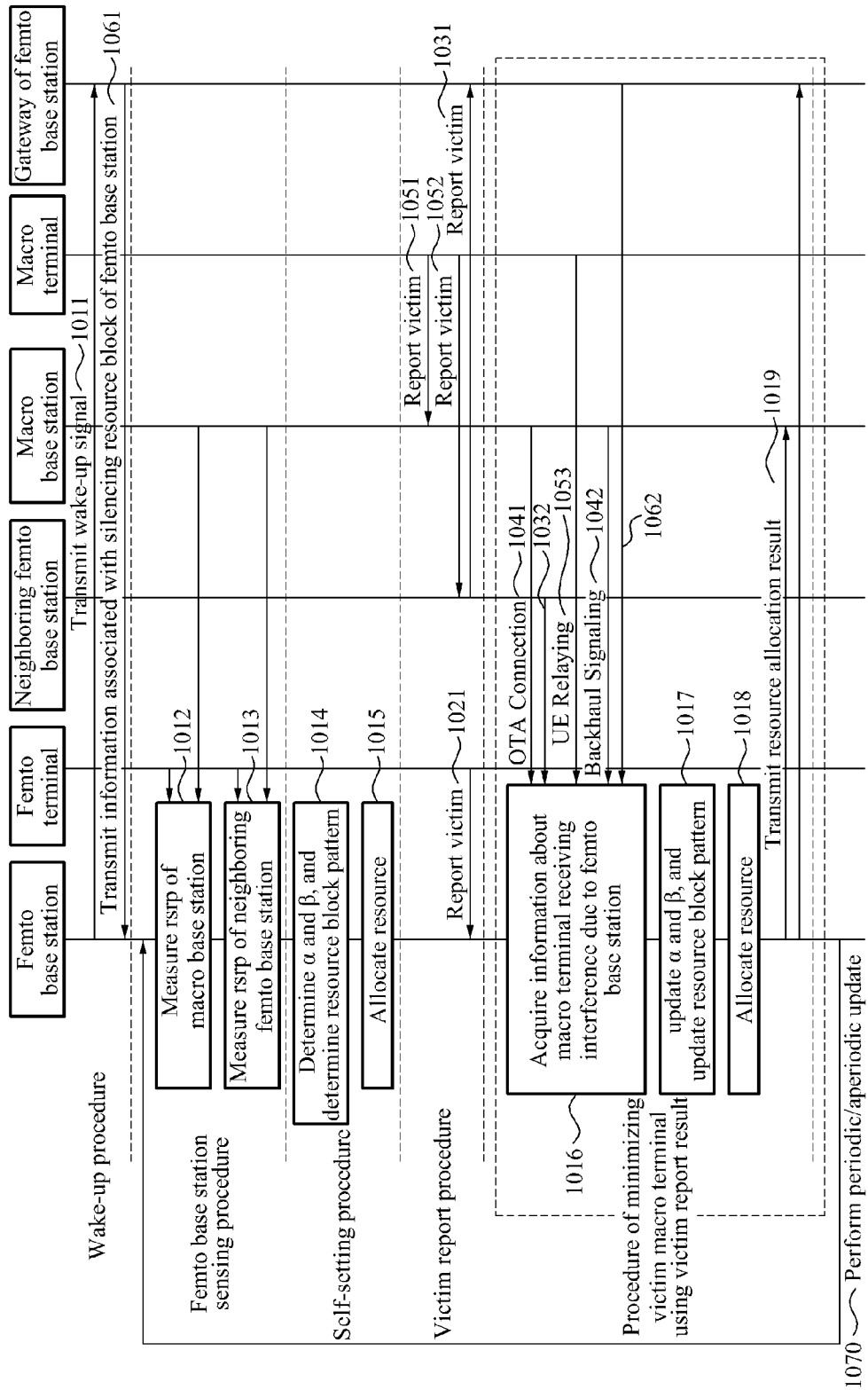
FIG. 10 is a flowchart illustrating a method in which a femto base station allocates a resource block of the femto base station based on a measurement result of the femto base station or a femto terminal corresponding to the femto base station.

FIG. 10 is a flowchart illustrating a method in which a femto base station allocates a resource block of the femto base station based on a measurement result of the femto base station or a femto terminal corresponding to the femto base station.

1) Wake-up Procedure

In operation 1011, the femto base station may transmit a wake-up signal to a gateway of the femto base station. The femto base station may request for backhaul information regarding a network address or similar information.

In operation 1061, the gateway of the femto base station may transmit, to the femto base station, information associated with a silencing resource block of the femto base station in response to the wake-up signal. The information associated with the silencing resource block of the femto base station may include femto base station information such as the backhaul information regarding the network address, physical cell identification (ID), and the like.

2) Femto Base Station Sensing Procedure

In operation 1012, the femto base station may measure an RSRP of the macro base station. The RSRP of the macro base station may include an RSRP from the macro base station to the femto base station and an RSRP from the macro base station to the femto terminal. The femto base station may measure the RSRP from the macro base station to the femto base station based on a signal received from the macro base station, and may measure the RSRP from the macro base station to the femto terminal based on a signal received from the macro base station. That is, the femto terminal may measure the RSRP from the macro base station to the femto terminal based on the signal received from the macro base station, and the femto base station may acquire the RSRP of the macro base station by receiving information regarding the RSRP from the macro base station to the femto terminal measured by the femto terminal. Based on the measured RSRP of the macro base station, a distance between the femto base station and the macro base station may be estimated. The estimation of the distance may be used to determine α, as described further above.

In operation 1013, the femto base station may measure an RSRP of a neighboring femto base station. The RSRP of the neighboring femto base station may include an RSRP from the neighboring femto base station to the femto base station, and an RSRP from the neighboring femto base station to the femto terminal. The femto base station may measure the RSRP from the neighboring femto base station to the femto base station based on a signal received from the neighboring femto base station, and measure the RSRP from the neighboring femto base station to the femto terminal based on a signal received from the neighboring femto base station. That is, the femto terminal may measure the RSRP from the neighboring femto base station to the femto terminal based on the signal received from the neighboring femto base station. Accordingly, the femto base station may acquire the RSRP of the neighboring femto base station by receiving the RSRP from the neighboring femto base station to the femto terminal measured by the femto terminal. Based on the measured RSRP of the neighboring femto base station, a distance between the femto base station and the neighboring femto base station may be estimated. That is, whether the femto base station and the neighboring femto base station are installed relatively close to each other may be determined based on the RSRP of the neighboring femto base station.

3) Self-setting Procedure

In operation 1014, the femto base station may determine α, β, and a resource block pattern based on the information associated with the silencing resource block of the femto base station, the RSRP of the macro base station, and the RSRP of the neighboring femto base station.

In operation 1015, the femto base station may allocate the resource blocks to the femto terminal using α, β, and the resource block pattern.

4) Victim Report Procedure

In operation 1051, the macro terminal in which a victim occurs due to interference may report to the macro base station information regarding a victim state such as interference from the femto base station or similar information. In the report of the victim state, CSI of the macro terminal or information regarding a resource block preferred by the macro terminal may be included.

In operation 1052, a neighboring femto terminal in which the victim occurs due to interference may report to a neighboring femto base station information regarding the victim state from the femto base station. The neighboring femto terminal corresponds to the neighboring femto base station. In operation 1031, the neighboring femto base station may report to a gateway of the femto base station information regarding the victim state. In operation 1021, the femto terminal may report to the femto base station information regarding the victim state. Unlike the macro terminal or the neighboring femto terminal in which the victim occurs due to interference, the victim state of the femto terminal may not be due to interference of the femto base station, but may occur due to services of the femto base station corresponding to the femto terminal not meeting requirements of the femto terminal. Other various victim report methods may be applied.

5) Procedure of Minimizing Victim Macro Terminal Using Victim Report Result

As described above, since the femto base station may not be aware of whether a victim terminal receiving interference due to the femto base station is present, the femto base station may protect the victim terminal which may or may not be present, by determining α and β based on a distance between the macro base station and the neighboring femto base station. However, when the victim terminal is determined to not be present for a predetermined period of time, since the femto base station does not waste the resource blocks for the victim terminal, whether the victim terminal is present near the femto base station may be determined in order to update α and β.

Accordingly, in operation 1016, the femto base station may acquire information about the victim terminal receiving interference due to the femto base station. That is, the femto base station may acquire information regarding the victim state of the victim terminal. Three examples of methods for acquiring the information regarding the victim terminal receiving the interference due to the femto base station include:

i) In an OTA Connection (On The Air Connection) method, the macro terminal may inform the macro base station via an uplink channel of the victim state, and the macro base station may inform a corresponding femto base station via a wireless channel of the victim state in operation 1041.

In operation 1032, the neighboring femto terminal may inform the neighboring femto base station of the victim state via the uplink channel, and the femto base station may receive information regarding the victim state from the neighboring femto base station via the wireless channel.

ii) In a User Equipment method or a Terminal Relaying method, the victim terminal may directly inform the femto base station via the wireless channel of the victim state in operation 1053.

iii) In a Backhaul signaling method, the macro terminal may inform the macro base station of the victim state via the uplink channel, and the macro base station may inform a corresponding femto base station via a wired backhaul channel of the victim state in operation 1042. In operation 1062, the neighboring femto terminal may inform a corresponding neighboring femto base station of the victim state via the uplink channel, and the femto base station may acquire the victim state from the gateway of the femto base station via a wired backhaul channel.

In operation 1017, the femto base station may update α, β, and a resource block pattern based on information regarding the victim terminal receiving the interference due to the femto base station (that is, the macro terminal or the neighboring femto terminal). The femto base station may update α, β, and the resource block pattern based on information such as presence or absence of the victim terminal, a number of the victim terminals, a CSI of the victim terminal, and the like. The femto base station may update α, β, and the resource block pattern based on QoS of the femto terminal corresponding to the femto base station.

In operation 1018, the femto base station may allocate resource blocks to the femto terminal using the updated α, β, and resource block pattern. In operation 1019, the femto base station may transmit results of the resource allocation to a gateway of the macro base station or the femto base station. The transmission of the results may be, for example, to more readily control interference among the femto base stations. The results of the resource allocation may be used, for example, for the wake-up procedure when a new femto base station is installed.

6) Continuous Update Procedure

In operation 1070, the hierarchical cell communication system may periodically or aperiodically repeat the sensing procedure of the femto base station or the femto terminal corresponding to the femto base station, the self-configuring procedure, the victim report procedure, and the procedure of substantially minimizing the victim terminal using the victim report result. That is, α, β, and the resource block pattern may be continuously updated according to a change in the communication environment.

Figure 11:
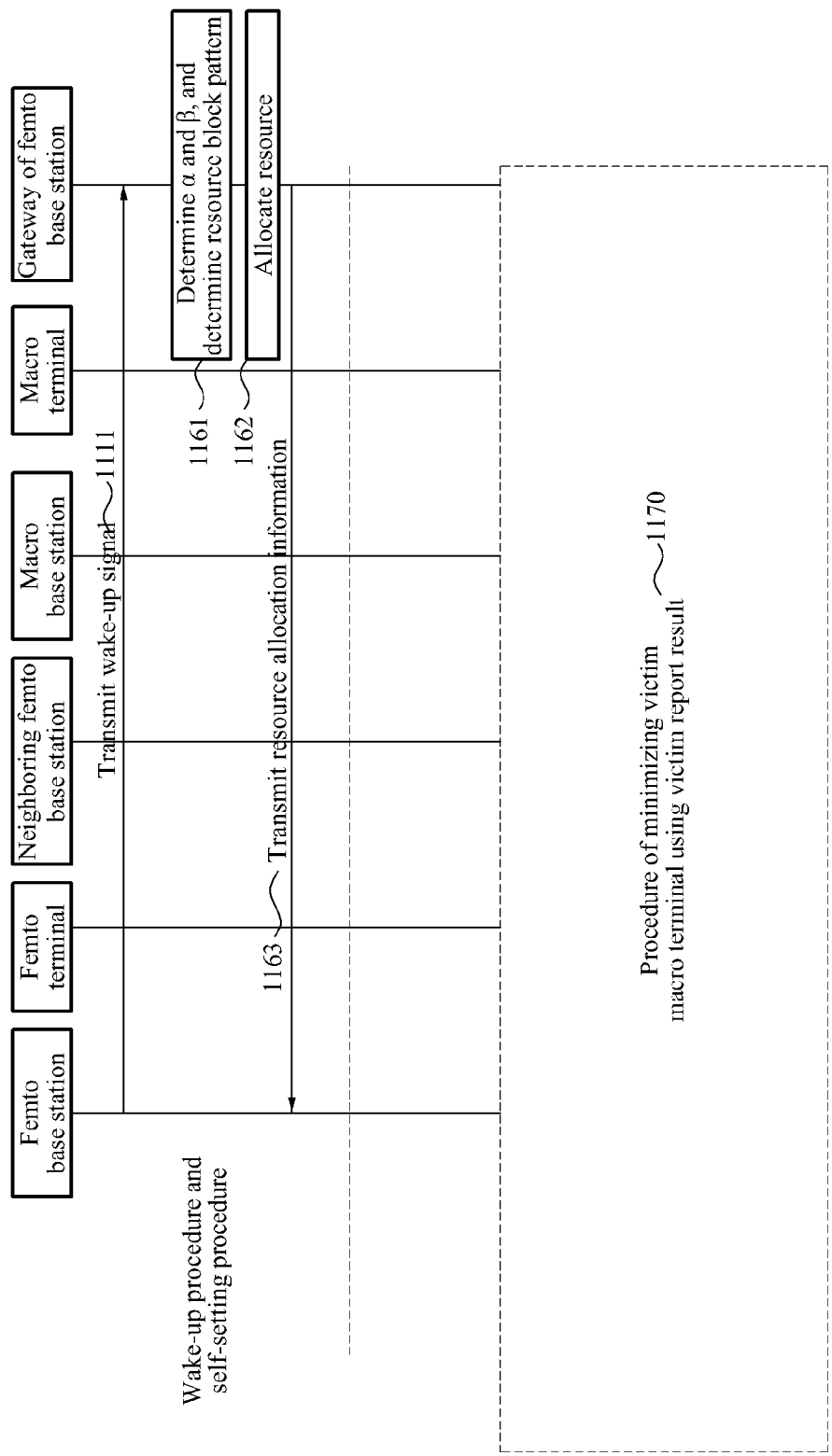
FIG. 11 is a flowchart illustrating a method in which a gateway of a femto base station allocates a resource block of the femto base station based on network information.

FIG. 11 is a flowchart illustrating a method in which a gateway of a femto base station allocates a resource block of the femto base station based on network information.

1) Wake-up and Self-setting Procedure

In operation 1111, the femto base station may transmit a wake-up signal to a gateway of the femto base station. The femto base station may request information such as backhaul information regarding a network address or similar information.

In operation 1161, the gateway of the femto base station may determine α, β, and a resource block pattern in response to the wake-up signal. As compared to the example illustrated in FIG. 10, α, β, and the resource block pattern in the example illustrated in FIG. 11 may be determined by the gateway of the femto base station based on the network information.

In operation 1162, the gateway of the femto base station may allocate resource blocks of the femto base station based on α, β, and the resource block pattern.

In operation 1163, the gateway of the femto base station may transmit, to the femto base station, all or a part of the above-described information associated with the silencing resource block of the femto base station and resource block allocation information, in response to the wake-up signal. The femto base station may serve the femto terminal based on the resource block allocation information.

2) Procedure of Minimizing Victim Terminal Using Victim Report Result (Operation 1170)

Similar to the operations described above with respect to FIG. 10, the femto base station may acquire information regarding interference received from the femto base station to the victim terminal, and update α, β, and the resource block pattern based on the acquired information. The operations associated with the updating of α, β, and the resource block pattern have been described above with respect to FIG. 10 and thus, are omitted here for brevity and clarity.

The gateway of the femto base station may update α, β, and the resource block pattern based on the information regarding the interference received from the femto base station to the victim terminal.

Figure 12:
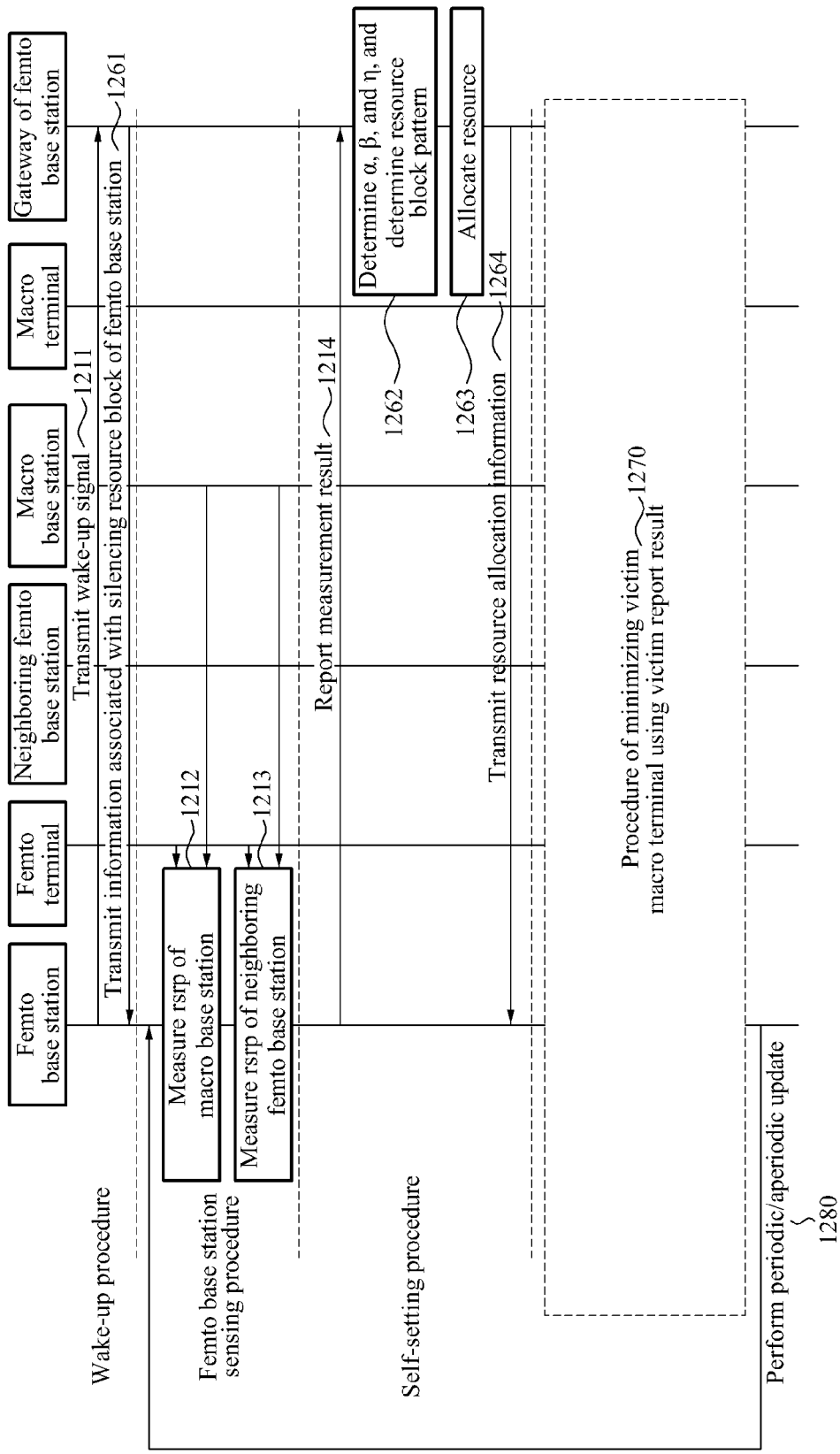
FIG. 12 is a flowchart illustrating a method in which a gateway of a femto base station allocates a resource block of the femto base station based on network information and a measurement result of the femto base station or a femto terminal corresponding to the femto base station.

FIG. 12 is a flowchart illustrating a method in which a gateway of a femto base station allocates a resource block of the femto base station based on network information and a measurement result of the femto base station or a femto terminal corresponding to the femto base station.

Referring to FIG. 12, information used for determining α, β, and the resource block pattern may be similar to that illustrated in FIG. 10. However, with respect to FIG. 12, the gateway of the femto base station is used for determining α, β, and the resource block pattern. Further descriptions of the similar procedure described above with respect to FIG. 10 will be omitted.

1) Wake-up Procedure

In operation 1211, the femto base station may transmit a wake-up signal to a gateway of the femto base station. In operation 1261, the gateway of the femto base station may transmit, to the femto base station, information associated with a silencing resource block of the femto base station in response to the wake-up signal. As described above, the information associated with the silencing resource block of the femto base station may include backhaul information regarding a network address or similar information, as well as femto base station information such as a physical cell ID or similar information.

2) Femto Base Station Sensing Procedure

In operation 1212, the femto base station may measure an RSRP of the macro base station. The RSRP of the macro base station may include an RSRP from the macro base station to the femto base station and an RSRP from the macro base station to the femto terminal. The femto terminal corresponding to the femto base station may measure the RSRP from the macro base station to the femto terminal, and transmit this RSRP to the femto terminal.

In operation 1213, the femto base station may measure an RSRP of a neighboring base station. The RSRP of the neighboring femto base station may include an RSRP from the neighboring femto base station to the femto base station and an RSRP from the neighboring femto base station to the femto terminal. The neighboring femto terminal corresponding to the neighboring femto base station may measure the RSRP from the femto base station to the neighboring femto terminal, and transmit this RSRP to the femto base station.

3) Self-setting Procedure

In operation 1214, the femto base station may transmit, to the gateway of the femto base station, measurements regarding the RSRP of the macro base station and the RSRP of the neighboring femto base station. That is, the femto base station may transmit a request to the gateway of the femto base station regarding wireless resource allocation.

In operation 1262, the gateway of the femto base station may determine α, β, a resource block pattern based on network information, information associated with the silencing resource block of the femto base station, the RSRP of the macro base station, and the RSRP of the neighboring femto base station. When α of the macro base station or the neighboring femto base station is determined, η may be determined.

In operation 1263, the gateway of the femto base station may allocate the resource block of the femto base station based on α, β, and the resource block pattern.

In operation 1264, the gateway of the femto base station may transmit resource block allocation information to the femto base station. The femto base station may serve the femto terminal based on the resource block allocation information.

4) Procedure of Minimizing Victim Terminal Using Victim Report Result (Operation 1270)

Similar to the operations described above with respect to FIG. 10, the femto base station may acquire information regarding interference received from the femto base station to the macro terminal, and update α, β, and the resource block pattern based on the acquired information. The operations associated with the updating of $\alpha$, $\beta$, and the resource block pattern have been described above with respect to FIG. 10 and thus, are omitted here for brevity and clarity.

5) Continuous Update Procedure

In operation 1270, the hierarchical cell communication system may periodically or aperiodically repeat the sensing procedure of the femto base station or the femto terminal corresponding to the femto base station, the self-configuring procedure, the victim report procedure, and the procedure of substantially minimizing the victim terminal using the victim report result. That is, $\alpha$, $\beta$, and the resource block pattern may be continuously updated according to a change in the communication environment.

Figure 13:
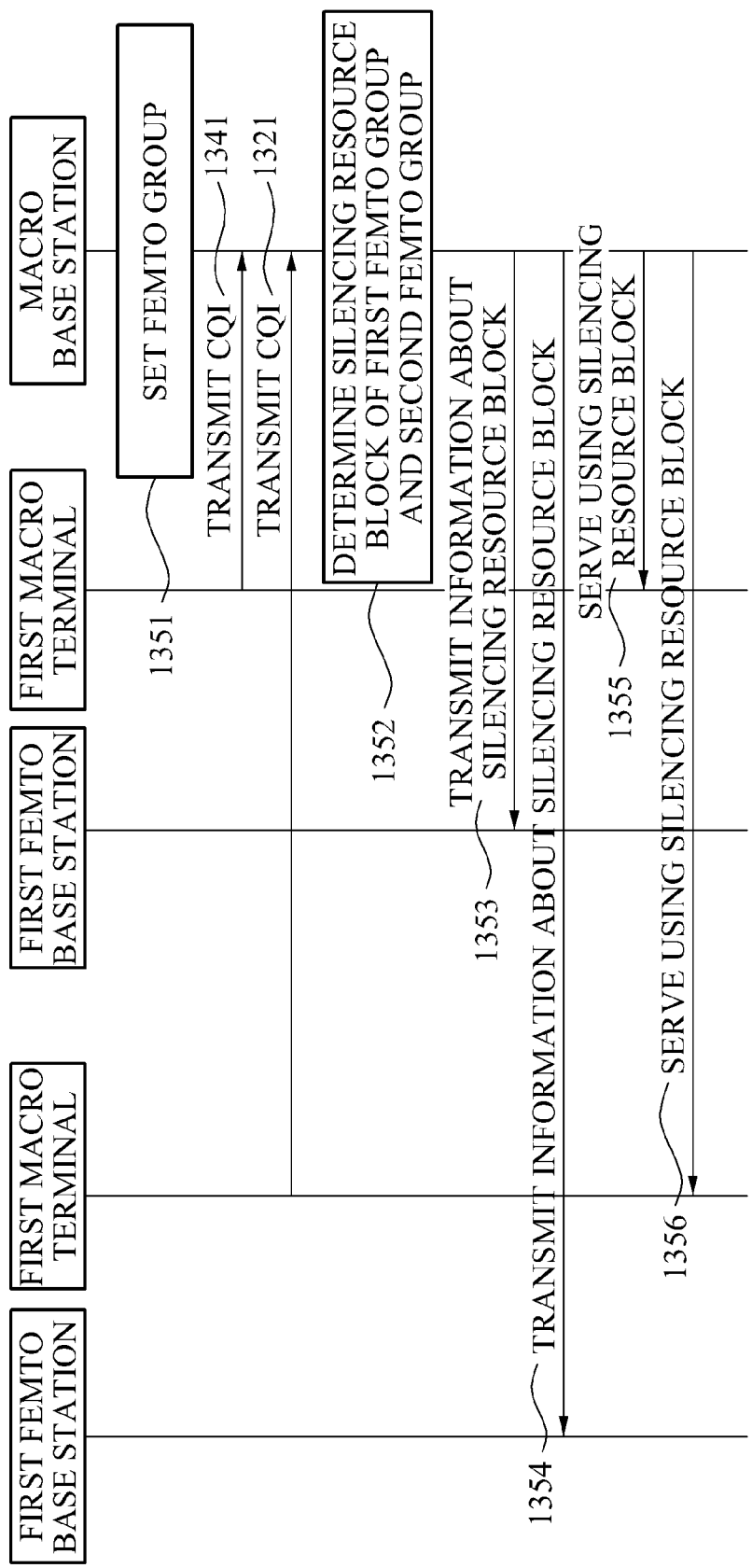
FIG. 13 is a flowchart illustrating a method in which a macro base station allocates a common silencing resource for each femto group.

FIG. 13 is a flowchart illustrating a method in which a macro base station allocates a common silencing resource for each femto group.

A method of determining $\eta$ for each femto group by the macro base station in a hierarchical cell communication system, such as that illustrated in FIG. 7, is described below with reference to FIG. 13.

In operation 1351, the macro base station may set a first femto group including at least one of a first femto base station, and a second femto group including at least one of a second femto base station.

In operations 1341 and 1321, the macro base station may receive, respectively from the first macro terminal adjacent to the first femto group and the second macro terminal adjacent to the second femto group, a CSI of the first macro terminal and a CSI of the second macro terminal.

In operation 1352, the macro base station may determine a silencing resource block $\eta_1$ of the first femto group and a silencing resource block $\eta_2$ of the second femto group based on the CSI of the first macro terminal and the CSI of the second macro terminal. The macro base station may determine $\eta_1$ and $\eta_2$ in such a manner that $\eta_1$ and $\eta_2$ are not overlapped to a maximal degree.

In operation 1354, the macro base station may transmit the silencing resource block $\eta_1$ of the first femto group to the first femto group, and in operation 1353, the macro base station may transmit the silencing resource block $\eta_2$ of the second femto group to the second femto group.

In operation 1356, the macro base station may serve the first macro terminal using the silencing resource block $\eta_1$ of the first femto group. In operation 1355, the macro base station may serve the second macro terminal using the silencing resource block $\eta_2$ of the second femto group.

The processes, functions, methods, and/or software described herein may be recorded in one or more non-transitory computer-readable media including program instructions to implement various operations executed or performed by a computer. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. In addition, a non-transitory computer-readable storage medium may be distributed among computer systems connected through a network and non-transitory computer-readable codes or program instructions may be stored and executed in a decentralized manner.

Figure 14:
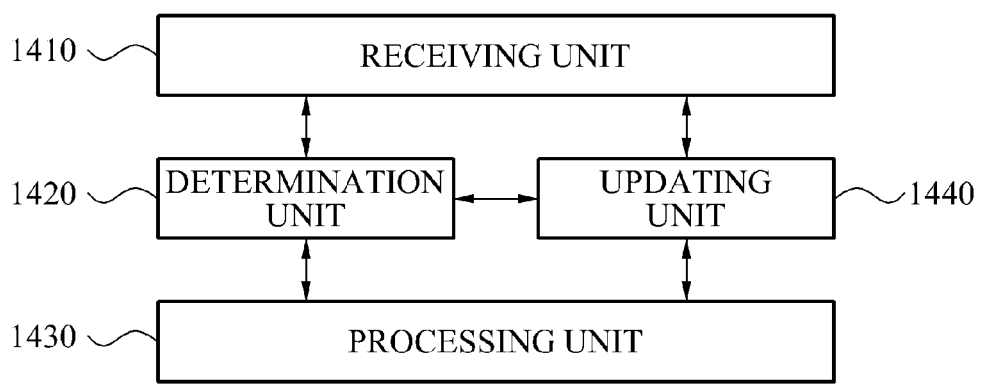
FIG. 14 is a diagram illustrating a communication device in a hierarchical cell communication environment including a macro base station, a femto base station, and a neighboring femto base station.

FIG. 14 is a diagram illustrating a communication device in a hierarchical cell communication environment including a macro base station, a femto base station, and a neighboring femto base station.

According to one example, the femto base station or the gateway of the femto base station may determine $\alpha$, $\beta$, and the resource block pattern. That is, the communication device described with reference to FIG. 14 may be the femto base station or the gateway of the femto base station.

Referring to FIG. 14, the communication device includes a receiving unit 1410, a determination unit 1420, a processing unit 1430, and an updating unit 1440.

The receiving unit 1410 may receive information regarding a silencing resource block $\eta$ of the femto base station. The silencing resource block $\eta$ may be used for protecting the macro terminal from interference generated in the macro terminal corresponding to the macro base station due to the femto base station.

The information regarding the silencing resource block $\eta$ of the femto base station may include a method of determining a resource block $\eta$ on which the femto base station is to perform the silencing, a resource block on which the femto base station is to first perform the silencing, and/or a resource block to perform the silencing.

The receiving unit 1410 may also receive information about the macro terminal corresponding to the macro base station. The information about the macro terminal may include information associated with services provided from the femto base station to the macro terminal.

Further, the receiving unit 1410 may receive information about a victim terminal of the macro base station. The information about the victim terminal may include information associated with interference transmitted from the femto base station to the victim terminal.

The determination unit 1420 may determine available resource block $\alpha$ of the femto base station based on the information about the silencing resource block $\eta$, and may determine target resource block $\beta$ of the femto base station within the available resource block $\alpha$ based on the resource block used by the neighboring femto base station. Herein, the available resource block $\alpha$ and the target resource block $\beta$ may each include one or more resource blocks.

The determination unit 1420 may determine the available resource block $\alpha$ of the femto base station according to a relative location between the macro base station and the femto base station. Subsequently, the determination unit 1420 may determine a number of the target resource blocks $\beta$ of the femto base station and the target resource block, based on a power of the signals transmitted from the neighboring femto base station to the femto base station in the resource block used by the neighboring femto base station.

Also, the determination unit 1420 may determine the target resource block according to a predefined rule of reducing a number of the resource blocks overlapped with the at least one of the resource blocks used by the neighboring femto base station. The predefined rule may be received from the gateway of the femto base station.

The predefined rule may be associated with a cell ID structure of the femto cell. Each of the femto base stations may use resource blocks that are orthogonal to each other, using the cell ID structure. For example, if two femto base stations are present, the predefined rule associated with the cell ID structure may be represented as the following Equation 1:

$$N_{ID}{}^{cell}=a\times N_{ID}{}^{(1)}+N_{ID}{}^{(2)}.$$ [Equation 1]

In Equation 1, 'a' denotes an orthogonal factor.

The processing unit 1430 may process the target resource block to facilitate communication between the femto terminal and the femto base station. That is, when the communication device is the femto base station, the processing unit 1430 may serve the femto terminal using a target resource. When the communication device is the gateway of the femto bases station, the processing unit 1430 may transmit information about the target resource block to the femto base station.

The updating unit 1440 may update the available resource block α of the femto base station and the target resource block β of the femto base station based on information about the macro terminal corresponding to the macro base station. Also, the updating unit 1440 may update the available resource block α of the femto base station and the target resource block β of the femto base station based on a number of the victim terminals receiving the interference due to the femto base station.

A communication device according to one example of the invention is described above. The examples described with reference to FIGS. 1 to 13 may be applied to the communication device, and thereby further descriptions will be omitted.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method executed by a femto base station operating in a hierarchical cell communication system including a macro base station, the femto base station, and a neighboring femto base station, the communication method comprising:
   receiving information associated with a silencing resource block of the femto base station, including information for protecting a macro terminal, served by the macro base station, from interference generated by the femto base station;
   determining one or more available resource blocks of the femto base station based upon the information associated with the silencing resource block;
   determining a target resource block of the femto base station based upon the one or more available resource blocks and a resource used by the neighboring femto base station; and
   serving the femto terminal using the target resource block, wherein
   the target resource block of the femto base station is included within the one or more resource blocks of the femto base station.

2. The communication method of claim 1, wherein the information associated with the silencing resource block of the femto base station comprises a method of determining a resource block on which the femto base station is to perform a silencing, a resource block on which the femto base station is to first perform a silencing, a resource block on which a silencing is to be performed, or any combination thereof.

3. The communication method of claim 1, wherein
   the one or more available resource blocks of the femto base station are determined according to the distance between the macro base station and the femto base station.

4. The communication method of claim 1, wherein
   the target resource block of the femto base station is determined based on the power of a signal received from the neighboring femto base station.

5. The communication method of claim 1, wherein
   the target resource block of the femto base station is determined according to a predefined rule for reducing the number of resource blocks overlapped with the one or more resource blocks used by the neighboring femto base station.

6. The communication method of claim 1, further comprising:
   receiving information about the macro terminal, which is served by the macro base station, information about a femto terminal, which is served by the femto base station, information about a neighboring femto terminal, which is served by the neighboring femto base station, or any combination thereof; and
   updating the one or more available resource blocks of the femto base station and the target resource block of the femto base station, based on the received information.

7. The communication method of claim 6, wherein
   the information about the macro terminal served by the macro base station or the information about the neighboring femto terminal served by the neighboring femto base station is received from the macro base station or the neighboring femto base station via a wireless channel.

8. The communication method of claim 6, wherein
   the information about the macro terminal or the information about the femto terminal served by the femto base station is directly received from the macro terminal served by the macro base station.

9. The communication method of claim 6, wherein
   the information about the macro terminal served by the macro base station or the information about the neighboring femto terminal served by the neighboring femto base station is received from a gateway of the macro base station or the femto base station via a wired backhaul channel.

10. The communication method of claim 6, wherein the
    the one or more available resource blocks of the femto base station and the target resource block of the femto base station are updated based on the number of macro terminals served by the macro base station or the number of neighboring femto terminals served by the neighboring femto base station, wherein
    each of the macro terminals served by the macro base station and each of the neighboring femto terminals served by the neighboring femto base station receives interference from the femto base station.

11. The communication method of claim 6, wherein
    the one or more available resource blocks of the femto base station and the target resource block of the femto base station are updated based on a Quality of Service (QoS) of the femto terminal served by the femto base station.

12. The communication method of claim 1, wherein
    the information associated with the silencing resource block of the femto base station is received according to a broadcast scheme or a multicast scheme.

13. A communication method executed by a macro base station operating in a hierarchical cell communication system, the communication method comprising:

establishing a first femto group, the first femto group including a first femto base station;

establishing a second femto group, the second femto group including a second femto base station;

receiving, from a first macro terminal adjacent to the first femto group, Channel State Information (CSI) of the first macro terminal;

receiving, from a second macro terminal adjacent to the second femto group, CSI of the second macro terminal;

determining a silencing resource block of the first femto group and a silencing resource block of the second femto group, based on the CSI of the first macro terminal and the CSI of the second macro terminal; and transmitting information about the silencing resource block of the first femto group and information about the silencing resource block of the second femto group.

14. The communication method of claim 13, further comprising:

serving the first macro terminal using the silencing resource block of the first femto group; and serving the second macro terminal using the silencing resource block of the second femto group.

15. The communication method of claim 13, wherein the silencing resource block of the first femto group and the silencing resource block of the second femto group are determined such that an overlap of the silencing resource block of the first femto group and the silencing resource block of the second femto group is substantially minimized.

16. A communication device operating in a hierarchical cell communication system that includes a macro base station, a femto base station, and a neighboring femto base station, the communication device comprising:

a receiving unit configured to receive information associated with a silencing resource block of the femto base station that is used for protecting a macro terminal from interference received from the femto base station;

a determination unit configured to determine one or more available resource blocks of the femto base station based upon the information associated with the silencing resource block, and to determine a target resource block of the femto base station based upon the one or more resource blocks and a resource used by the neighboring femto base station; and a processing unit configured to process the target resource block to facilitate communication between the femto terminal and the femto base station, wherein the target resource block of the femto base station is included within the one or more resource blocks of the femto base station.

17. The communication device of claim 16, wherein the information associated with the silencing resource block of the femto base station comprises a method of determining a resource block on which the femto base station is to perform a silencing, a resource block on which the femto base station is to first perform a silencing, a resource block on which a silencing is to be performed, or any combination thereof.

18. The communication device of claim 16, wherein the determination unit determines the one or more available resource blocks of the femto base station based upon the distance between the macro base station and the femto base station.

19. The communication device of claim 16, wherein the determination unit determines the target resource block of the femto base station based upon the power of a signal transmitted from the neighboring femto base station to the femto base station.

20. The communication device of claim 16, wherein the determination unit determines the target resource block of the femto base station based upon a predefined rule for reducing the number of the one or more resource blocks overlapped with the resource block used by the neighboring femto base station.

21. The communication device of claim 16, wherein:

the receiving unit receives information about the macro terminal, which is served by the macro base station, information about the femto terminal, which is served by the femto base station, information about the neighboring femto terminal, which is served by the neighboring femto base station, or any combination thereof; and the communication device further comprises an updating unit configured to update the one or more available resource blocks of the femto base station and the target resource block of the femto base station, based on the received information.

22. The communication device of claim 21, wherein the updating unit updates the one or more available resource blocks of the femto base station and the target resource block of the femto base station, based on the number of macro terminals served by the macro base station or the number of neighboring femto terminals served by the neighboring femto base station, each receiving interference from the femto base station.

23. The communication device of claim 21, wherein the updating unit updates the one or more available resource blocks of the femto base station and the target resource block of the femto base station based on a quality of service (QoS) of the femto terminal served by the femto base station.

* * * * *